United States Patent [19]
Barbee

[11] 3,863,294
[45] Feb. 4, 1975

[54] APPARATUS FOR APPLYING ELECTRICAL CURRENT TO LIVESTOCK CARCASSES DURING HIDE PULLING OPERATIONS

[75] Inventor: Wilford O. Barbee, Charter Oak, Iowa

[73] Assignee: Iowa Beef Processors, Inc., Dakota City, Nebr.

[22] Filed: May 4, 1972

[21] Appl. No.: 250,210

[52] U.S. Cl. .................................................. 17/21
[51] Int. Cl. ............................................ A22b 05/16
[58] Field of Search ............................... 17/21, 50

[56] References Cited
UNITED STATES PATENTS
3,537,130  11/1970  McDonnell ........................... 17/50
3,626,550  12/1971  Troy ..................................... 17/21

Primary Examiner—Hugh R. Chamblee
Attorney, Agent, or Firm—Browne, Beveridge, DeGrandi & Kline

[57] ABSTRACT

A livestock carcass is supported from a trolley while the hide is forcibly pulled therefrom. During the forcible pulling of the hide, an electrical current is passed through the carcass by use of an electrode which is maintained at a different electrical potential from the carcass-supporting trolley. The electrode is moved between an extended position where it lies in the path of and against the carcass and a retracted position where it is acted upon by sterilizing means.

8 Claims, 2 Drawing Figures

APPARATUS FOR APPLYING ELECTRICAL CURRENT TO LIVESTOCK CARCASSES DURING HIDE PULLING OPERATIONS

This invention relates to means for applying an electrical charge to livestock carcasses during hide pulling operations and involves an electrode which is moved between a carcass-contacting extended position and a retracted position where it is subjected to the action of a sterilizing means.

In recent years, a great deal of attention has been directed to mechanized methods of hide removal by gripping the hide of an animal carcass and forcibly pulling it from the carcass. When hides are pulled in a direction generally parallel to the spinal column of the carcass, the carcasses are sometimes damaged and their value reduced due to separation of the vertabrae and consequent tearing of the adjacent meaty portions of the carcass. In order to avoid such damage, it has been proposed to apply electrodes to spaced portions of the carcass, thereby causing the flow of about 1 to 5 amperes of electric current and a potential of about 10 to 480 volts which causes muscle contraction to resist the tendency of the vertabrae to separate. Reference is made to U.S. Pat. No. 3,537,130 of Richard L. McDonnell which discloses such a procedure.

Prior to my invention, it has been the practice to station a worker along the processing line to manipulate a pair of hand-held electrodes which are inserted into spaced apart portions of the carcass. Between successive carcasses, the electrodes are placed in a sterilizing solution to prevent the transmission of contamination from one carcass to another. This practice is a tedious one and requires the full time attention of a responsible operator.

According to the present invention, the manual handling of the carcass-contacting electrodes is avoided due to the provision of an electrode which is supported for movement between an extended position where it will contact a carcass on a trolley or other support means, and a retracted position where it is acted upon by sterilizing means. The electrode is maintained at a different electrical potential from the trolley or other support means, whereby an electrical current will pass through the carcass as the hide is forcibly pulled therefrom.

Figure 1:
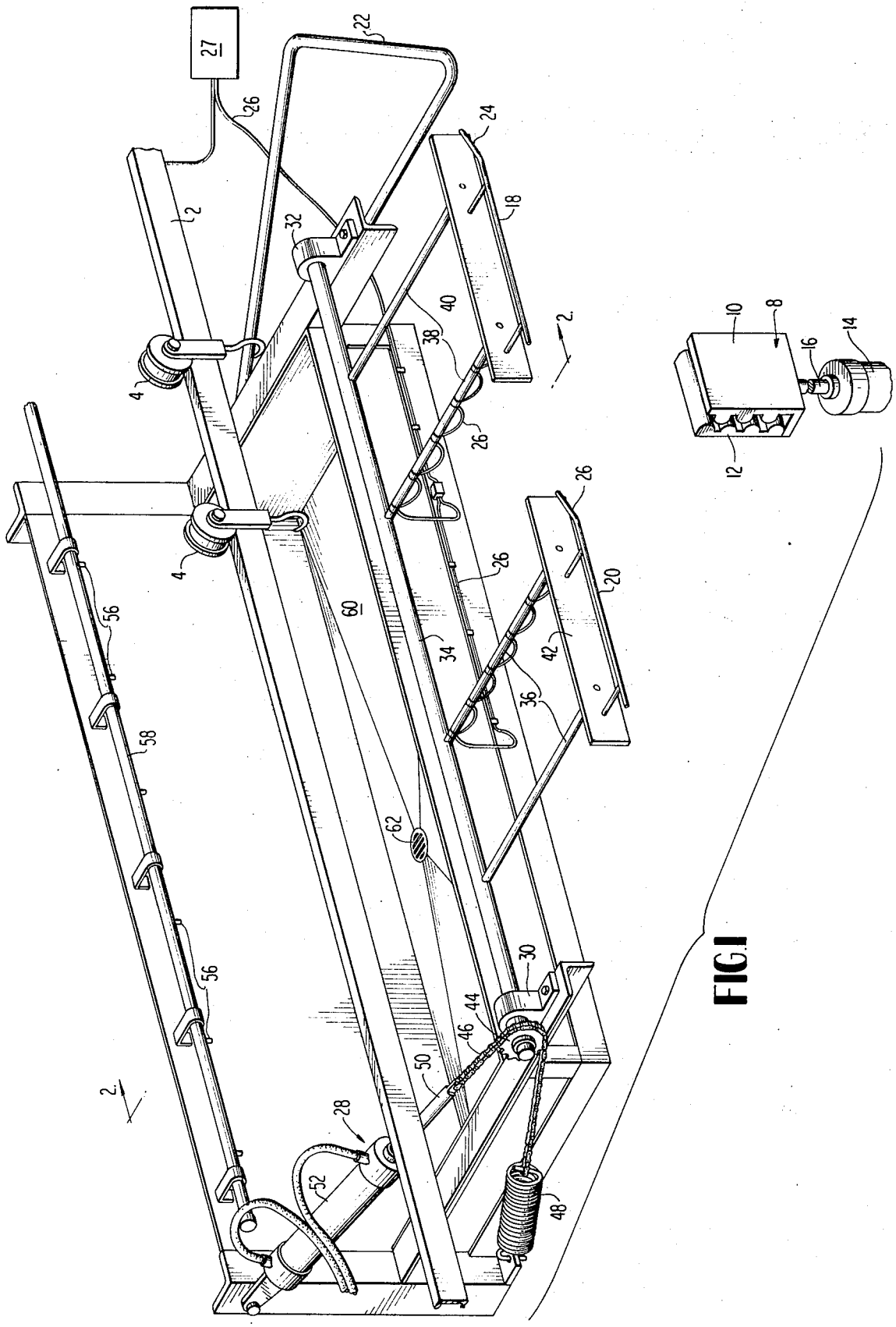
FIG. 1 is a perspective view of the invention.
Figure 2:
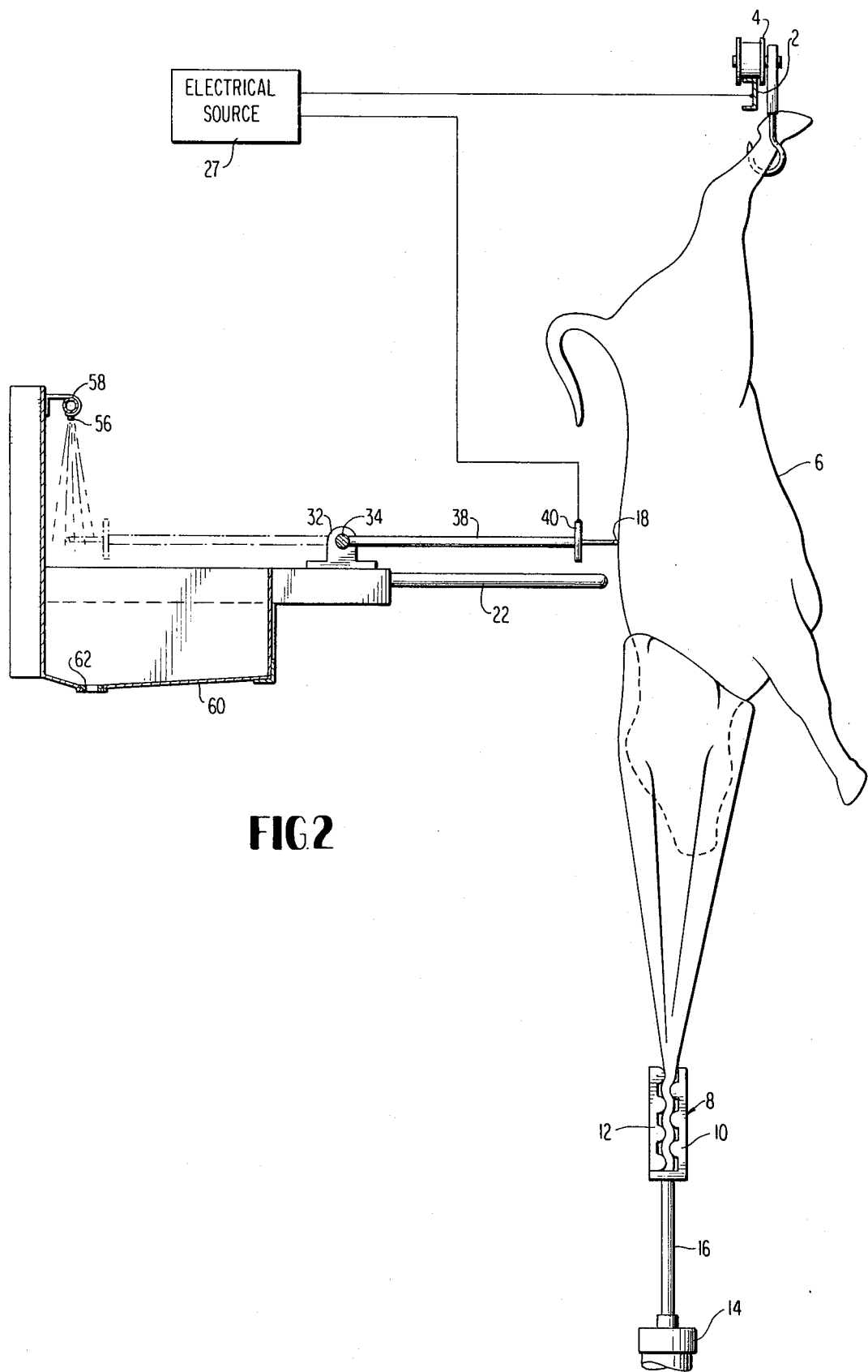
FIG. 2 is a side view showing the invention in its operative position.

A preferred embodiment of the present invention is shown in the accompanying drawings which show a conventional rail 2 which supports a plurality of trolleys 4, each of which has means for engaging the hind legs of the carcass 6. Prior to arriving at the illustrated hide-pulling station, the hide has already been stripped, either manually or by machine, from the sides and upper or hind portion of the back. The stripped portion of the hide is hanging downwardly where it is engageable by a gripper assembly 8 shown diagramatically to include a pair of relatively movable plates 10 and 12 for engaging the free end of the hide which is already hanging loose. Means such as a small hydraulic cylinder are provided for urging the plates 10 and 12 together, and these plates may be provided with confronting configurations well-known in the art to promote their engagement with the hide. The gripper assembly 8 may be moved vertically by any conventional means which in itself constitutes no portion of the invention. As illustrated, an hydraulic cylinder 14 has a rod 16 connected to the plates 10 and 12 in order to impart the vertical movement to the gripper assembly 8.

The electrodes 18 and 20 contact the suspended carcass when in their extended position which is illustrated in solid lines. The movement of the carcass into engagement with the electrodes is assured by the provision of a stationary deflector which includes a bar 22 which is angularly offset from the path of a carcass moving along the rail 2. This bar 22 guides the carcasses into contact with the electrode 18 which has a forward end portion 24 inclined away from the path of the carcasses to prevent obstruction of carcass movement by the forward end portion of the electrode. A similar forward end portion 25 is provided on the electrode 20.

The electrodes 18 and 20 are given an electrical potential which differs from the potential of the rail 2 and trolley 4. Electrical conductors 26 connect the electrodes to an electrical source diagramatically illustrated at 27. If desired, vertically spaced sets of electrodes may be provided with different electrical potentials, but for convenience it is preferred to achieve the potential difference by maintaining the rail 2 and trolley 4 at ground potential and giving a higher electrical potential to the electrodes 18 and 20.

The support for the electrodes 18 and 20 includes a stationary main frame 28 which supports a pair of bearing blocks 30 and 32. An elongated shaft 34 is supported by the bearing blocks 30 and 32 and has radially extending arms 36 and 38 which respectively support the mounting plates 40 and 42 for the electrodes 18 and 20.

The shaft 34 is rotated 180° by a sprocket 44 which is keyed to one end thereof. A drive chain 46 which engages the sprocket has one end connected to a return spring 48 and its other end connected to the rod 50 of the hydraulic cylinder 52. It will be apparent that the flow of hydraulic fluid to the cylinder 52 through the conduits 54 will cause movement of the chain 46, rotation of the sprocket 44 and its connected shaft 34, and swinging movement of the electrodes 18 and 20.

The swinging movement of the electrodes 18 and 20 carries them from their extended carcass-contacting position to a retracted position which is shown in broken lines. When in this retracted position, the electrodes are sterilized by a hot water spray from the nozzles 56 on a stationary pipe 58 which is mounted on the frame 28. The hot water is provided from any conventional source and, after it strikes the electrodes 18 and 20, it is collected by a drain pan 60 which has a drain outlet 62. If desired, a sterilizing immersion bath for the electrodes may be used in lieu of the spray means.

The manner of operation of the disclosed apparatus will be evident from the foregoing description. Carcasses approaching the illustrated hide-pulling station will be guided by the bar 22 into contact with the leading end 24 of the electrode 18. The gripper assembly 8 is connected to the free end portion of the carcass, the electrodes 18 and 20 are energized and the hydraulic cylinder 14 pulls the gripper assembly downwardly to remove the hide from the carcass in an over-the-head manner. The electrodes 18 and 20 may be deenergized, if desired, and the hydraulic cylinder 52 is actuated to retract the rod 50 and pull the chain 46 to rotate the sprocket 44 and electrode-supporting shaft 34.

When the rod 50 of the hydraulic cylinder 52 is fully retracted, the electrodes 18 and 20 will lie in the path of the hot water spray discharged by the nozzles 56, thereby sterilizing the electrodes. The water, after striking the electrodes, is collected by drain pan 60. The hydraulic cylinder 52 is then actuated to extend the rod 50 and return the electrodes 18 and 20 to their extended positions prior to arrival of the next carcass. If desired, this latter step may be performed after the carcass is already located at the hide-pulling station.

Those skilled in the art will appreciate that this invention greatly simplifies the procedure of applying an electrical current to a livestock carcass during a hide pulling operation. It will also be recognized that many modifications may be made hereto since it is not essential that the electrode-moving means be of this specific type disclosed or that the electrodes be movable in an arcuate path. Since modifications will arise, it is emphasized that the invention is not to be construed as relating only to the disclosed and preferred embodiment, but includes all apparatus falling within the spirit of the claims which follow.

I claim:

1. Apparatus for applying electrical current to livestock carcasses during hide pulling operations, comprising
   support means for supporting a carcass, said support means being maintained at a given electrical potential, said support means being a rail having trolleys movable therealong in a prescribed path,
   mechanical means for gripping the hide of the carcass and for pulling the hide from the carcass,
   a movably mounted electrode for contacting a carcass on the support means, said electrode being elongated in the direction of the prescribed path,
   means for maintaining the electrode and the support means at different electrical potentials,
   means for moving the electrode between a retracted position and an extended position where it is in contact with a carcass on the support means, and
   means for sterilizing the electrode when it is in its retracted position.

2. The apparatus of claim 1 wherein the sterilizing means is means for providing a spray of hot water which strikes the electrode when in its retracted position.

3. The apparatus of claim 2 having a receptacle with drain means for receiving the water from the sterilizing means.

4. The apparatus of claim 1 wherein the electrode has a forward end portion confronting the approaching carcasses, said forward end portion being inclined away from the prescribed path to prevent the obstruction of carcass movement by the forward end portion of the electrode.

5. The apparatus of claim 1 having a stationary deflector means confronting the carcasses approaching the apparatus to guide them into contact with the electrode.

6. The apparatus of claim 1 having a rotatable support rod connected to and supporting the electrode, and the means for moving the electrodes includes means for rotating the support rod to swing the electrode between its extended and retracted positions.

7. The apparatus of claim 1 wherein the electrode in its extended position is positioned to displace a carcass laterally from the position occupied by the carcass when hanging from the support means solely under the influence of gravity, thereby ensuring contact between the electrode and the carcass.

8. The apparatus of claim 1 having a second electrode which is longitudinally spaced from and maintained at the same electrical potential as the aforementioned electrode, said second electrode being elongated in the direction of the prescribed path.

* * * * *